US011783078B1

(12) United States Patent
Li et al.

(10) Patent No.: US 11,783,078 B1
(45) Date of Patent: Oct. 10, 2023

(54) DATABASE REDACTION FOR SEMI-STRUCTURED AND UNSTRUCTURED DATA

(71) Applicant: SNOWFLAKE INC., Bozeman, MT (US)

(72) Inventors: Yimeng Li, Bellevue, WA (US); Carl Yates Perry, Burlingame, CA (US); Raghavendran Ramakrishnan, Kirkland, WA (US); Frantisek Rolinek, Seattle, WA (US); Yunqiao Zhang, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/304,063

(22) Filed: Apr. 20, 2023

(51) Int. Cl.
*G06F 21/62* (2013.01)
*G06F 16/28* (2019.01)

(52) U.S. Cl.
CPC ........ *G06F 21/6227* (2013.01); *G06F 16/285* (2019.01); *G06F 21/6254* (2013.01)

(58) Field of Classification Search
CPC ...... G06F 21/62; G06F 16/28; G06F 21/6227; G06F 21/6254; G06F 16/285
See application file for complete search history.

(56) References Cited

U.S. PATENT DOCUMENTS

| | | | |
|---|---|---|---|
| 11,024,299 B1 | 6/2021 | Drake et al. | |
| 11,055,289 B2 | 7/2021 | Bastawala et al. | |
| 11,144,669 B1 | 10/2021 | Rao | |
| 2013/0144901 A1* | 6/2013 | Ho | G06F 16/248 707/769 |
| 2014/0012833 A1 | 1/2014 | Humprecht | |
| 2019/0130123 A1 | 5/2019 | Ben-Yair et al. | |
| 2020/0074108 A1* | 3/2020 | Fox | G06F 21/6245 |
| 2020/0092314 A1* | 3/2020 | Mital | H04L 63/101 |
| 2021/0200901 A1* | 7/2021 | Vemula | G06F 18/2323 |
| 2022/0012357 A1* | 1/2022 | Rajeev | G06F 40/279 |
| 2022/0179991 A1* | 6/2022 | Jha | G06F 11/3065 |
| 2022/0188457 A1* | 6/2022 | Babu | G06F 21/6254 |

FOREIGN PATENT DOCUMENTS

| | | | | |
|---|---|---|---|---|
| EP | 3789900 A1 * | 3/2021 | ......... | G06F 16/2282 |
| WO | WO-2023081032 A1 * | 5/2023 | ....... | G06F 16/24564 |

* cited by examiner

*Primary Examiner* — Jayesh M Jhaveri
(74) *Attorney, Agent, or Firm* — Womble Bond Dickinson (US) LLP

(57) ABSTRACT

Embodiments of the present disclosure describe systems, methods, and computer program products for redacting sensitive data within a database. An example method can include examining a first column of a plurality of columns of a database to identify a first category of sensitive data in a first location of the first column and a second category of sensitive data in a second location of the first column, receiving a masking policy for the first column, the masking policy identifying the first category of sensitive data, and, in response to a data query accessing the first column, executing a redaction operation to redact the first category of sensitive data from the first location of the first column to generate redacted data for a response to the data query.

21 Claims, 10 Drawing Sheets

| ID 310 | Data 320 |
|---|---|
| 10 | {<br>  "name":"Robert Smith",<br>  "contact": {<br>    "address": {<br>      "street": "1 Snowflake Way",<br>      "zip code": "98033",<br>      "city": "Bellvue",<br>      "state": "WA"<br>    }<br>  },<br>  "gender": "Male",<br>  "age": 55,<br>  "ssn": 1234<br>} |
| 20 | {<br>  "name":"Jane Foster",<br>  "contact": {<br>    "address": {<br>      "street": "4 Data Lake Drive",<br>      "city": "San Mateo",<br>      "state": "CA",<br>      "zip code": "94402"<br>    },<br>    "phone":"650-555-5678"<br>  },<br>} |
| 30 | {<br>  "name":"John Smith",<br>  "gender": "Male",<br>  "contact": {<br>    "phone": "919-555-3456"<br>  },<br>  "age": 35,<br>  "ssn": 9012<br>} |

```
"Data": {
"privacy_category": "IDENTIFIER",
"semantic_category": "MULTIPLE"
"extraInfo": [
    {   "path": "name",
        "probability": "1.00",
330     "semantic_category": "NAME",
        "coverage":1.0
    },
    {   "path": "contact.address.street",
        "probability": "1.00",
        "semantic_category": "STREET_ADDRESS",
370     "coverage":0.7
    },
    {   "path": "contact.address.zip code",
        "probability": "1.00",
        "semantic_category": "POSTAL_CODE",
        "coverage": 0.7
    372
    },
    {   "path": "contact.address.city",
        "probability": "1.00",
        "semantic_category": "CITY",
        "coverage": 0.7
    },
    {  374 "path": "contact.address.state",
        "probability": "1.00",
        "semantic_category": "STATE_OR_TERRITORY",
        "coverage": 0.7
    },
    {   "path": "age",
        "probability": "0.9",
        "semantic_category": "AGE",
        "coverage":0.7
    },
    {   "path": "ssn",
        "probability": "1.00",
        "semantic_category": "SSN",
        "coverage":0.7
    },
    {   "path": "gender",
        "probability": "1.00",
        "semantic_category": "GENDER",
        "coverage":0.7
} ]
```

FIG. 3B

| ID 410 | Data 420 |
|---|---|
| 10 | "Robert Smith lives at 1 Snowflake Way,Bellvue", WA, 98033. He is a 55 year old male. His social security number is 1234." |
| 20 | "Jane Foster lives at 4 Data Lake Drive, San Mateo, CA, 94402. She is a 41 year old female whose phone number is 650-555-5678. Her social security number is 6789." |
| 30 | "John Smith is a 35 year old male whose phone number is 919-555-3456. His social security number is 9012." |

FIG. 4A

| ID 410 | Data 420 | Index 460 |
|---|---|---|
| 10 | "Robert Smith lives at 1 Snowflake Way,Bellvue, WA, 98033. He is a 55 year old male. His social security number is 1234." | NAME:0, 12<br>STREET_ADDRESS:22, 15<br>CITY: 39, 7<br>STATE_OR_TERRITORY: 48, 2<br>POSTAL_CODE: 52:5<br>AGE: 27:2<br>GENDER:79:4<br>SSN: 115:4 |
| 20 | "Jane Foster lives at 4 Data Lake Drive, San Mateo, CA, 94402. She is a 41 year old female whose phone number is 650-555-5678. Her social security number is 6789." | NAME:0, 11<br>STREET_ADDRESS:22, 17<br>.<br>.<br>. |
| 30 | "John Smith is a 35 year old male whose phone number is 919-555-3456. His social security number is 9012." | NAME:0, 10<br>AGE:17, 2<br>GENDER: 29, 4<br>.<br>. |

FIG. 4B

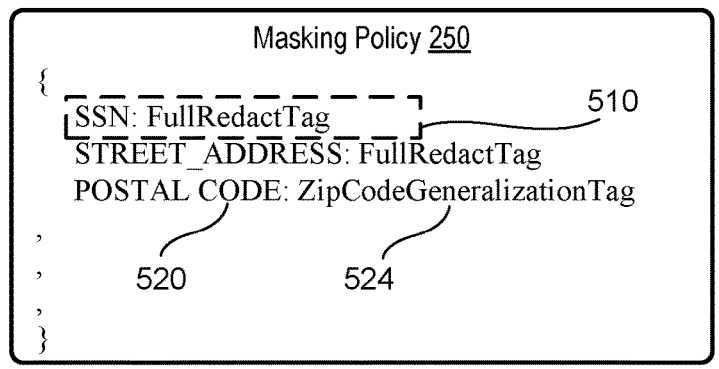

FIG. 5A

| COLUMN | SEMANTIC CATEGORY | MASKING POLICY TAG |
|---|---|---|
| ID | NONE | NONE |
| ▶ DATA | MULTIPLE | NONE |

FIG. 5B

| COLUMN | SEMANTIC CATEGORY | MASKING POLICY TAG |
|---|---|---|
| ID | NONE | NONE |
| ▼ DATA | MULTIPLE | NONE |
| NAME | NAME | NONE |
| CONTACT.ADDRESS.STREET | STREET_ADDRESS | FullRedactTag |
| CONTACT.ADDRESS.ZIP CODE | POSTAL_CODE | ZipCodeGeneralizationTag |
| CONTACT.ADDRESS.CITY | CITY | NONE |
| CONTACT.ADDRESS.STATE | STATE_OR_TERRITORY | NONE |
| AGE | AGE | NONE |
| SSN | SSN | FullRedactTag |
| GENDER | GENDER | NONE |

FIG. 5C

DATABASE REDACTION FOR SEMI-STRUCTURED AND UNSTRUCTURED DATA

TECHNICAL FIELD

The present disclosure relates to database operations and, in particular, to redacting sensitive information within database data.

BACKGROUND

Databases are widely used for data storage and access in computing applications. Databases may include one or more tables that include or reference data that can be joined, read, modified, or deleted using queries. Databases can store small or extremely large sets of data within one or more tables. This data can be accessed by various users in an organization or even be used to service public users, such as via a website or an application program interface (API).

Personally identifiable information (PI) includes any information that permits the identity of an individual to be directly or indirectly inferred, including any information that is linked or linkable to that individual. Protected health information (PHI) includes individually identifiable information relating to the past, present, or future health status of an individual.

BRIEF DESCRIPTION OF THE DRAWINGS

The described embodiments and the advantages thereof may best be understood by reference to the following description taken in conjunction with the accompanying drawings.

These drawings in no way limit any changes in form and detail that may be made to the described embodiments by one skilled in the art without departing from the scope of the described embodiments.

FIG. 3A is an example of semi-structured data of a database, in accordance with some embodiments of the present disclosure.

FIG. 3B is a schematic illustration of an example path mapping based on the semi-structured data FIG. 3A, in accordance with some embodiments of the present disclosure.

FIG. 4A is an example of unstructured data of a database, in accordance with some embodiments of the present disclosure.

FIG. 4B is a schematic illustration of an example index mapping based on the unstructured data FIG. 4A, in accordance with some embodiments of the present disclosure.

FIG. 5A is a block diagram illustrating an example of a masking policy, in accordance with some embodiments of the present disclosure.

FIG. 5B illustrates an example of a user interface for generating a masking policy, in accordance with some embodiments of the present disclosure.

FIG. 5C illustrates an example of a user interface for selecting a masking policy for multiple categories of sensitive data within a particular column, in accordance with some embodiments of the present disclosure.

DETAILED DESCRIPTION

Figure 1:
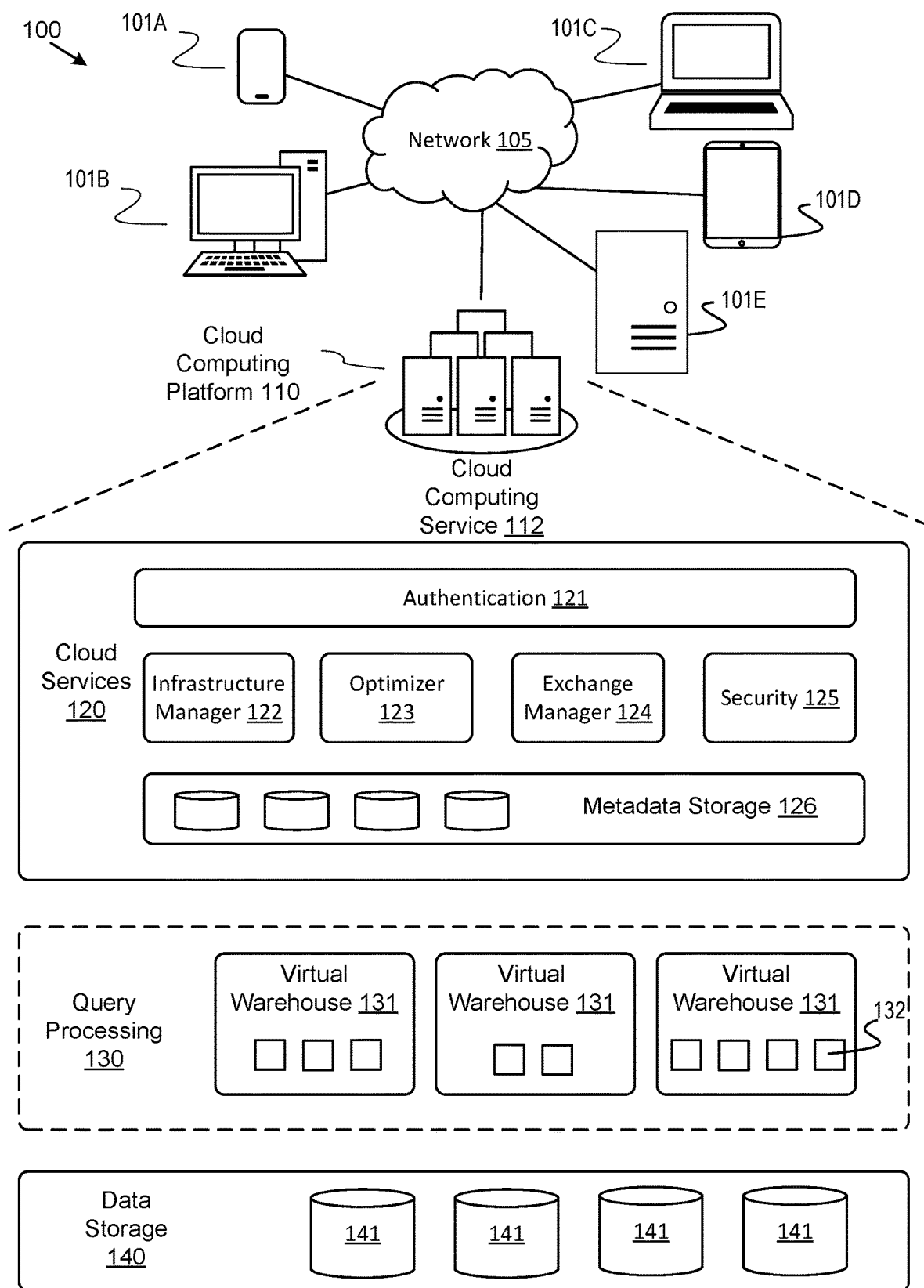
FIG. 1 is a block diagram depicting an example computing environment in which the methods disclosed herein may be implemented.

In the systems and methods described herein, a data storage system utilizes a SQL (Structured Query Language)-based relational database. However, these systems and methods are applicable to any type of data storage architecture and using any language to store and retrieve data within the data storage. The systems and methods described herein provide a mechanism for performing data mapping of data held within a database to identify sensitive data for later redaction. In some embodiments, the redaction may be generated for data columns containing semi-structured and/or unstructured data.

Databases increasingly contain large amounts of data created and/or stored from many sources. In many cases, the data in the databases may contain sensitive data in the form of personal and/or sensitive information, which may need to be protected. As used herein, "sensitive data" refers to data the exposure of which is desired to be controlled and/or limited. For example, sensitive data may refer to PII and/or PHI, but the embodiments of the present disclosure are not limited thereto. In some embodiments, sensitive data includes data of a secret nature, such as national secrets, trade secrets, network credentials/secrets, or the like. As used herein, the term "and/or" includes any and all combinations of one or more of the associated listed items.

Some embodiments herein describe systems and methods that utilize the architecture of a database to provide the ability to perform redaction on sensitive data within a database. As used herein, "redaction" refers to the act of removing or masking (e.g., by replacing with alternate content) data. In some embodiments, the redaction may be performed on data within the database, without exposing the data being redacted outside the database (e.g., the redaction may be performed in situ within the database). In some embodiments, database functionality, such as a user-defined function (UDF), may be utilized to automatically recognize the sensitive data within the database and access the redaction. In some embodiments, the recognition of the sensitive data may be provided by a machine learning operation performed utilizing a machine learning model that is configured to recognize sensitive data within a data field.

Some conventional mechanisms that perform redaction on sensitive data, such as sensitive data within a database, may first export the data before performing the redaction. This export may remove the sensitive data from the database, which can expose the sensitive data to compromise and/or create a situation in which additional security is necessary. The embodiments described herein may reduce and/or minimize the data exchange utilized to perform redaction on sensitive data. For example, in some embodiments, the operations that perform the redaction of the sensitive data may be co-located with the sensitive data such that the sensitive data does not have to be exported from the database to be redacted. As a result, the sensitive data may not have to leave the boundary of the database as part of the redaction process. Moreover, performing the redaction by procedures that are co-located with the sensitive data may have increased performance, as unnecessary exports and/or additional processing are not required. In some embodiments, performing the redaction within the bounds of the database may reduce data governance issues, as the sensitive data does not necessarily need to be exported to perform the redaction and thus, does not need additional control procedures.

In addition, some techniques for redaction are limited to data columns and/or rows that contain structured data. Embodiments of the present disclosure may improve upon this redaction of structured data, and increase its scope to include both semi-structured and unstructured data. As used herein, structured data refers to a configuration of data within a column (e.g., of a database) in which all of the cells in a column have a single structure and present the value of a single logical concept or semantic category. For example, a "name" column that represents the name of the person in the record. With structured data, if any cells in the column have a different semantic meaning, they may be considered noise and indicate data quality issues.

As used herein, semi-structured data refers to a configuration of data within rows of a variant column that may include a plurality of logical concepts or semantic categories. In some embodiments, the data may be stored in hierarchical paths (also referred to herein as sub-columns) containing multiple leaf nodes. An example of semi-structured data includes JAVASCRIPT™ Object Notation (JSON) data and/or extensible markup language (XML) data, which may include multiple categories of data stored in an organized format, such as a plurality of key-value pairs. With semi-structured data, a significant number of rows may have a same or similar internal format and represent a virtual schema for the column, though strict adherence to the schema may not be required for all of the rows of the column.

As used herein, unstructured data refers to a configuration of data within rows of a free form column that has no fixed internal schema and/or the values of data within the cells are not of uniform semantic meaning. Examples of unstructured include, but are not limited to, a column including a text string, such as, for example, a column having cells (rows) with comments (natural language) or mixed information (emails, phone numbers, names) or a variant column with a random schema.

By supporting the redaction of semi-structured and/or unstructured data, embodiments of the present disclosure may allow for sub-column tagging of sensitive information and/or masking policies that support redaction of sensitive information at a sub-column level, without requiring redaction of the entire column. Embodiments described herein may allow users to selectively mask PI or other sensitive information in semi-structured data while keeping non-PII/non-sensitive data within the same column intact. Selectively masking PI may protect privacy while keeping the analytical value of the column data.

FIG. 1 is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™ or GOOGLE CLOUD PLATFORM™, or the like. As known in the art, a cloud computing platform 110 provides computing resources and storage resources that may be acquired (purchased) or leased and configured to execute applications and store data. The cloud computing platform 110 may be accessed by a client device 101 (e.g., a client device). Non-limiting examples of client devices include a smart phone 101A, personal computer 101B, laptop 101C, tablet computer 101D, server computer 101E, and/or another type of device that can process data.

FIG. 1 and the other figures may use like reference numerals to identify like elements. A letter after a reference numeral, such as "101A," indicates that the text refers specifically to the element having that particular reference numeral. A reference numeral in the text without a following letter, such as "101," refers to any or all of the elements in the figures bearing that reference numeral.

In some embodiments, client devices 101 may access the cloud computing platform 110 over a network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WIFI hotspot connected with the network 105 and/or a wireless carrier system that can be implemented using various data processing equipment, communication towers (e.g., cell towers), etc. The network 105 may carry communications (e.g., data, message, packets, frames, etc.) between the various components of the cloud computing platform 110 and one more of the client devices 101.

The cloud computing platform 110 may host a cloud computing service 112 that facilitates storage of data on the cloud computing platform 110 (e.g., data management and access) and analysis functions (e.g., SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution by compute nodes within elastic clusters of virtual machines, referred to herein as virtual warehouses or data warehouses. Thus, query processing 130 may include one or more virtual warehouses 131 having one or more compute nodes 132, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse 131 that expands, contracts, or shuts down according to the user's needs. Expanding a virtual warehouse 131 involves generating one or more compute nodes 132 to the virtual warehouse 131. Contracting a virtual warehouse 131 involves removing one or more compute nodes 132 from the virtual warehouse 131. More compute nodes 132 may lead to faster compute times. For example, a data load which takes fifteen hours on a system with four nodes might take only two hours with thirty-two nodes.

Cloud services 120 may be a collection of services (e.g., computer instruction executing on a processing device) that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, an authentication engine 121, an infrastructure manager 122, an optimizer 123, an exchange manager 124, a security engine 125, and/or a metadata storage 126.

In one embodiment, the cloud computing service 112 can perform a redaction operation on contents of the data in a data set of the cloud computing platform 110. In some embodiments, the redaction operation may include executing a machine learning operation to automatically recognize sensitive data within the data storage 140. In some embodiments, the redaction operation may be performed responsive to a command from a client device 101 of the cloud computing service 112, such as via a SQL statement. In some embodiments, the redaction operation may be triggered by one or more conditions within the cloud computing service 112, such as an automatic timer and/or a detection of a data modification to the data storage 140. Additionally, the cloud computing service 112 may generate an output data set of the redaction operation that may contain a redacted version of the sensitive data without altering the sensitive data within the data storage 140.

Figure 2:
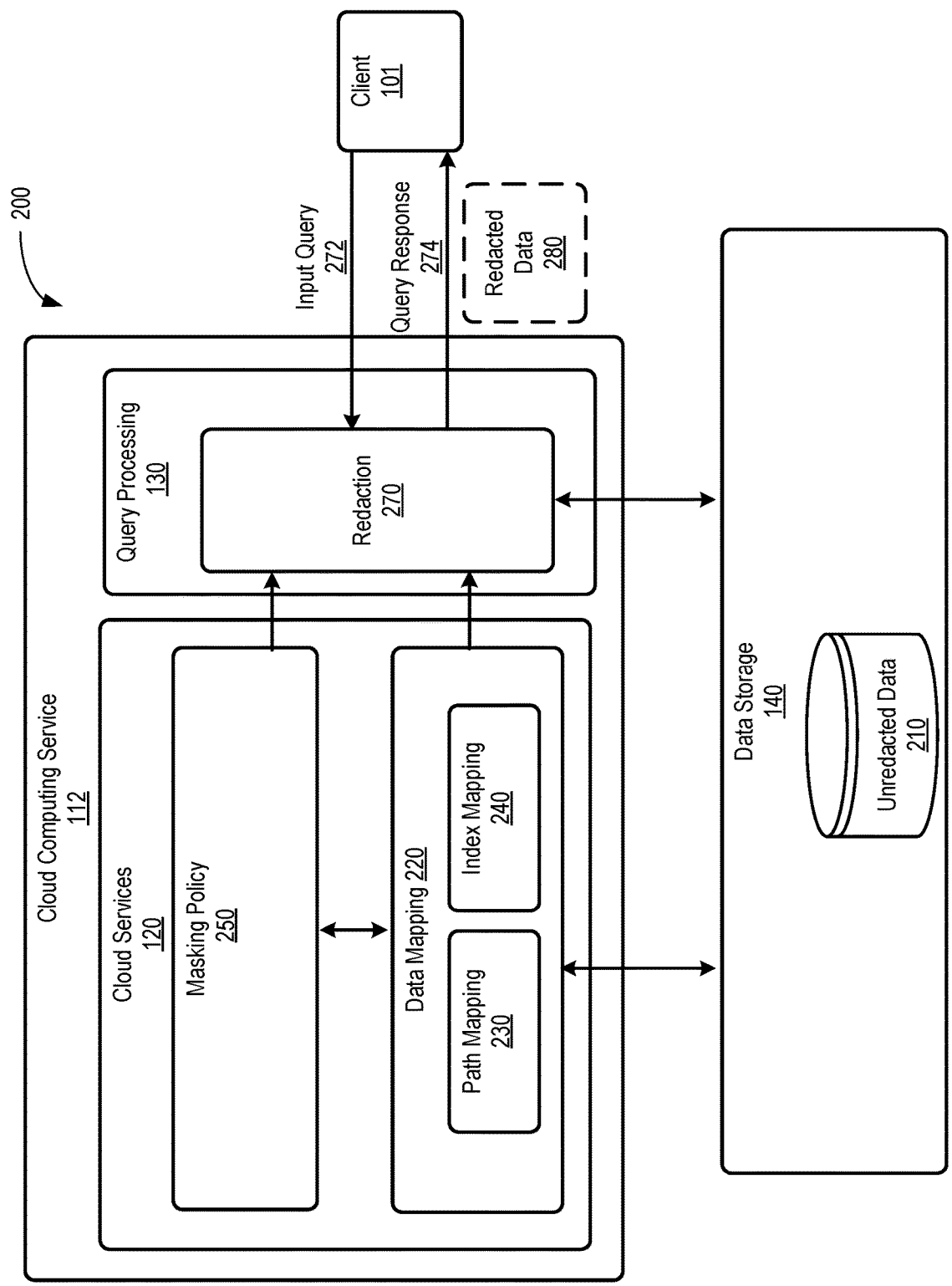
FIG. 2 is a schematic block diagram of an example embodiment of a system for performing a redaction on sensitive data in a database, in accordance with some embodiments of the present disclosure.

FIG. 2 is a schematic block diagram of an example embodiment of a system 200 for performing a redaction on sensitive data in a database, in accordance with some embodiments of the present disclosure. A description of elements of FIG. 2 that have been previously described will be omitted for brevity. In FIG. 2, the system 200 includes a cloud computing service 112 including a cloud services component 120 configured to perform a data mapping operation 220 (and/or execute a data mapping engine 220) and a query processing component 130 configured to perform a redaction operation 270 (and/or execute a redaction engine 270) in response to an input query 272.

The cloud services component 120 may be configured to perform a data mapping operation 220 on unredacted data 210 to generate a path mapping 230 and/or an index mapping 240. The data mapping operation 220 may be performed by a processing device of the cloud computing platform 110. For example, the data mapping operation 220 may be performed by the infrastructure manager 122 of the cloud computing platform 110, though the embodiments of the present disclosure are not limited to such a configuration. In some embodiments, the data mapping operation 220 may be performed by an external service or device.

In some embodiments, the unredacted data 210 can be any type of data set including unstructured data, structured data, semi-structured data, data stored in columns, or data that can be converted into columnar data (e.g., JavaScript Object Notation, key-value data, and/or other types of stored data). The unredacted data 210 may be stored, for example, in data storage 140.

The data mapping operation 220 may be configured to analyze the unredacted data 210 to identify the location of sensitive data within the unredacted data 210. In some embodiments, based on the location of the sensitive data, a masking policy 250 may be created that may be used to assist in the redaction operation 270, as will be discussed in further detail herein.

The data mapping operation 220 may generate the path mapping 230 and/or the index mapping 240. The path mapping 230 and/or the index mapping 240 may identify locations of the sensitive data within the unredacted data 210. In some embodiments, the path mapping 230 may be utilized to identify the locations of sensitive data within semi-structured data of the unredacted data 210 and/or the index mapping 240 may be utilized to identify the locations of sensitive data within unstructured data of the unredacted data 210, though the embodiments of the present disclosure are not limited to such a configuration.

In some embodiments, a masking policy 250 may identify which categories of sensitive information are to be redacted from the unredacted data 210 and/or the type of redaction to be performed. For example, an administrator of the cloud computing service 112 may analyze the path mapping 230 and/or the index mapping 240 to determine which locations are to be redacted, and how said redaction is to be performed. The administrator may generate and/or modify the masking policy 250 to redact particular categories of sensitive information from the unredacted data 210.

The path mapping 230 and/or the index mapping 240 may be utilized by the redaction operation 270, in conjunction with the masking policy 250, to determine whether data that results from an input query 272 (e.g., from a client 101) should be redacted. The redaction operation 270 may utilize the path mapping 230 and/or the index mapping 240 to determine if sensitive data is located among the unredacted data 210 that may be returned in response to the input query 272. The redaction operation 270 may utilize the masking policy 250 to determine if the sensitive data is to be redacted and, if so, what form that redaction should take. Based on the redaction operation 270, a query response 274 that is compliant with the masking policy 250 may be returned in response to the input query 272.

FIGS. 3A and 3B illustrate details related to the creation of the path mapping 230. FIG. 3A is an example of semi-structured data of a database, in accordance with some embodiments of the present disclosure. FIG. 3B is a schematic illustration of an example path mapping 230 based on the semi-structured data FIG. 3A, in accordance with some embodiments of the present disclosure. A description of elements of FIGS. 3A and 3B that have been previously described will be omitted for brevity. The data structures and mappings illustrated in FIGS. 3A and 3B are merely examples, and are not intended to limit the embodiments of the present disclosure.

Referring to FIGS. 2 and 3A, unredacted data 210 may include both structured and semi-structured data. In the example of FIG. 3A, two columns 310, 320 are shown as an example only. A first column 310, labeled as "ID" contains structured data. In the example of FIG. 3A, the "ID" column 310 contains uniformly formatted numeric values (e.g., 10, 20, 30, etc.).

A second column 320, labeled as "Data" contains semi-structured data. As previously noted, semi-structured data may include a variant column containing different types of data. For example, the data may include multiple paths 330. In FIG. 3A, a plurality of paths 330 are illustrated. Each path 330 may include some location within the variant data 340 of a particular entry (e.g., a cell within the second column 320). For example, the variant data 340 may include the following entry, as illustrated in FIG. 3A:

```
{
   "name":"Robert Smith",
   "contact": {
      "address": {
         "street": "1 Snowflake Way",
         "zip code": "98033",
         "city": "Bellvue",
         "state": "WA"
      }
   },
   "gender": "Male",
   "age": 55,
   "ssn": 1234
}
```

In the above example, the values "contact", "address", and "street" may all be paths 330 within the variant data. In some embodiments, the paths 330 may be hierarchical. For example, some of the paths 330 may be associated with other paths 330 in a parent-child relationship. That is to say that some paths 330 may be associated with a data value and some paths 330 may be associated with other paths 330. Those paths 330 that are associated with a data value may be referred to as a leaf node 335. For example, the leaf node "street" may contain the value "1 Snowflake Way".

In some embodiments, the variant data 340 may be accessed utilizing the various paths 330, including by leveraging the hierarchical nature of the paths. For example, the data may be accessed by, for example, by a reference (e.g., via an SQL statement) to "contact.address.zip code" which may refer to the value "98033" within the unredacted data 210. The same data may be referenced as part of "contact", which may refer to the value "{"address": ("street": "1 Snowflake Way", "zip code": "98033", "city": "Bellvue", "state": "WA"}" within the unredacted data 210. Thus, a particular data value at leaf node 335 may be accessed by a reference to its respective path 330 as well as a reference to a path 330 of a parent in its hierarchy.

In some embodiments, the variant data of the table (e.g., variant data 340) may include data in the JSON format, though the embodiments of the present disclosure are not limited thereto. Though variant data such as JSON may allow for a wide variety of data to be stored, it may make characterization of the data difficult, since data of different types may be included in a same cell. As illustrated in the example of FIG. 3A, not all cells may have the same information (e.g., some include "age" while other do not).

Moreover, the same types of information may not occur in the same order in each of the cells necessarily. Thus, with semi-structured data, both the schema and the order of the data may vary between cells. In some embodiments, different leaf nodes 335 of the same cell may include sensitive data of different categories.

For example, the unredacted data 210 may include sensitive data for different types of data within the variant data. For example, the various rows of the data column 320 may include data such as a name, a location, a company, etc. The data mapping operation 220 may perform an automatic data mapping of the unredacted data 210 to determine which portions of the unredacted data 210 contain sensitive data. In some embodiments, the data mapping operation 220 may be performed according to computer instructions that are configured to automatically detect and classify categories of sensitive data. In some embodiments, the data mapping operation 220 may be performed by machine learning algorithms. For example, the data mapping operation 220 may be performed according to a trained machine learning model that is configured to identify sensitive data from unredacted data 210, including variant data.

The data mapping operation 220 may be executed within the cloud computing service 112 by accessing one or more sets of computer instructions. Examples of software packages that can perform detection of sensitive data include packages that can perform natural language processing, such as the APACHE OpenNLP package. In some embodiments, extensions may be provided that allow access to such packages (e.g., the APACHE OpenNLP package) from within UDF functions.

The data mapping operation 220 may be configured to detect a number of different categories of sensitive data within the unredacted data 210. In other words, the data mapping operation 220 may be able to detect both that a given element of unredacted data contains sensitive data as well as what category of sensitive data it is. A non-exhaustive list of categories of sensitive data that may be detected by the data mapping operation 220 is included below in Table 1.

TABLE 1

| Sensitive Data Category | Explanation |
| --- | --- |
| NAME | Name of a person |
| ORGANIZATION | Company, group, government body, and/or other organization |
| STREET_ADDRESS | Residence information |
| POSTAL_CODE | E.g., zip code |
| CITY | Physical location (city) |
| COUNTY | Physical location (county) |
| STATE_OR_TERRITORY | Physical location (state) |
| COUNTRY | Address or other geographic location |
| EMAIL | Email address |
| URL | URL to website or other network resource |
| IP_ADDRESS | Network IP address |
| DATETIME | Date and/or time of day |
| DATE_OF_BIRTH | Date of birth |
| ETHNICITY | Ethnicity or nationality of a person |
| AGE | All components of age, spans of age, and any age references |
| GENDER | Gender of a person |
| PAYMENT_CARD | Credit card/debit card number |
| PHONE_NUMBER | Phone number |
| FAX | Fax number |
| SSN | U.S. Social Security Number |
| DRIVER_LICENSE | Driver license number |
| PASSPORT | Passport number |
| ID | Other types of identifiers including but not limited to: Medical Record number |

TABLE 1-continued

| Sensitive Data Category | Explanation |
| --- | --- |
| | Health Plan number |
| | Vehicle/Device unique identifiers |
| OCCUPATION | Job, Job title, or other indicator of a profession/employment |
| CLOUD_CREDENTIALS | Credential and/or secrets from major cloud providers e.g. AWS_SECRET_KEY |
| IBAN | International Bank Account Number |
| IMEI | International Mobile Equipment Identity, which is a unique number for identifying a device on a mobile network |
| VIN | Vehicle identification number |
| US_BANK_ACCOUNT | Banking information |
| LATITUDE, LONGITUDE | Physical location information |
| MARITAL_STATUS | Marital status of a person |
| SALARY | Salary, or other financial information |

The categories listed in Table 1 are merely examples, and more or fewer categories of sensitive data may be detected without deviating from the scope of the present disclosure. For example, the category SSN may be less useful for non-US residents. However, other categories of country-specific data may be included as a sensitive data category, such as the Social Insurance Number in Canada, the identification number from the Resident Identity Card in China, the National Insurance number of the United Kingdom, or the like.

Referring to the example of FIG. 3A, it can be seen that variant data 340 of a single cell may contain a number of different categories of sensitive data. For example, the same cell (using the example above) may contain variant data 340 of category NAME ("Robert Smith"), data of category SSN ("1234"), data of category AGE ("55"), to name just a few. In addition, different cells may have different categories of sensitive data. This provides at least two challenges. First, the different categories of sensitive data impede any ability to categorize the column with a single category of sensitive data. Moreover, redacting the column becomes more nuanced. For example, the data column 320 contains data of SSN category. A policy that redacted any column which contained SSN data may redact most of the information in the column, despite the fact that an SSN value is only a portion of the data. Data mapping operation 220 may analyze the unredacted data 210 to identify both what categories of sensitive data are present as well as which paths (e.g., sub-columns) 330 the sensitive data are associated with to generate the path mapping 230.

FIG. 3B illustrates an example of a path mapping 230 that may result from the data mapping operation 220. The path mapping 230 of FIG. 3B may refer to a portion of the data from the example of FIG. 3A in terms of data values for the path mapping 230. These data values are merely examples to illustrate the types of characterizations that may be made by the data mapping operation 220.

Referring to FIG. 3B, as a result of data mapping operation 220, the path mapping 230 may include a categorization of various paths 330 that are detected within the unredacted data 210. For each path 330, a category 372 (illustrated as "SEMANTIC_CATEGORY" in FIG. 3B) may be provided that indicates which, if any, category of sensitive data is associated with the given path 330. In the example of FIG. 3B, the path 330 "name" may be associated with a category 372 of "NAME", the path 330 "contact.address.street" may be associated with a category 372 of "STREET_ADDRESS", the path 330 "contact.address.zip code" may be associated with a category 372 of "POSTAL_CODE", the path 330 "contact.address.city" may be associated with a category 372 of "CITY", the path 330 "contact.address.state" may be associated with a category 372 of "STATE_OR_TERRITORY", the path 330 "age" may be associated with a category 372 of "AGE", the path 330 "ssn" may be associated with a category 372 of "SSN", the path 330 "gender" may be associated with a category 372 of "GENDER", and so on.

In some embodiments, for each element of sensitive data identified by the data mapping operation 220, a score and/or probability 370 may be provided that indicates the likelihood that the identified data is sensitive data. For example, referring to FIG. 3B, the data mapping operation 220 may determine that the path "contact.address.street" has a probability of 1.0 (e.g., 100%, as one example, or "high" probability as another example) of being data related to a person's street address, and is therefore sensitive data.

In some embodiments, for each element of sensitive data identified by the data mapping operation 220, a coverage statistic 374 may be provided that indicates a frequency with which the given element of sensitive data occurs within the particular column. As previously discussed, with semi-structured data, the schema for the data may vary from cell to cell. As a result, a particular path 330 may not be present in all of the cells of a particular column. The coverage statistic 374 may identify a frequency with which the sensitive data occurs. For example, referring to FIG. 3B, the data mapping operation 220 may determine that the path "contact.address.city" has a coverage statistic of 0.7 (e.g., 70% frequency, as one example, or "medium" frequency as another example) of being present in a particular cell.

FIGS. 3A and 3B illustrate the use of paths 330 (or sub-columns) of a path mapping 230 as identifiers for locations of sensitive information, but the embodiments of the present disclosure are not limited to such a configuration. In some embodiments, the location of sensitive information may be provided as an index offset into the data. Such a configuration may be useful for unstructured data, though its use is not limited to such a configuration. In some embodiments, an index may also be utilized for semi-structured data as well.

FIGS. 4A and 4B illustrate details related to the creation of the index mapping 240. FIG. 4A is an example of unstructured data of a database, in accordance with some embodiments of the present disclosure. FIG. 4B is a schematic illustration of an example index mapping 240 based on the unstructured data FIG. 4A, in accordance with some embodiments of the present disclosure. A description of elements of FIGS. 4A and 4B that have been previously described will be omitted for brevity. The data structures and mappings illustrated in FIGS. 4A and 4B are merely examples, and are not intended to limit the embodiments of the present disclosure.

Referring to FIGS. 2 and 4A, unredacted data 210 may include both structured and unstructured data. In the example of FIG. 4A, two columns 410, 420 are shown as an example only. A first column 410, labeled as "ID" contains structured data. In the example of FIG. 4A, the "ID" column 410 contains uniformly formatted numeric values (e.g., 10, 20, 30, etc.).

A second column 420, labeled as "Data" contains unstructured data. As previously noted, unstructured data may include a free form column that has no fixed internal schema and/or the values of data within the cells are not of uniform semantic meaning. For example, the data may include a text string. In FIG. 4A, each of the cells in the data column 420 contains a free-form string, where the string has different categories of sensitive data at different location. For example, the data column 420 may include the following data 440, as illustrated in FIG. 4A: "Robert Smith lives at 1 Snowflake Way, Bellvue", WA, 98033. He is a 55 year old male. His social security number is 1234."

In the above example, the paths 330 (see FIG. 3A) that were present in the semi-structured data are absent. However, the example data entry 440 may still contain different categories of sensitive data within a given cell. For example, referring to the example of FIG. 4A, the example data entry 440 may contain data of category NAME ("Robert Smith"), data of category SSN ("1234"), data of category AGE ("55"), to name just a few. As previously described, the different categories of sensitive data in the data column 420 may provide challenges for some types of redaction operations. In some embodiments, data mapping operation 220 may analyze the unredacted data 210 (including unstructured data) to identify both what categories of sensitive data are present as well as its offset within the data of the cell (e.g., an index to the location) to generate the index mapping 240. The index may indicate an offset from the beginning of the data at which a particular category of sensitive data is found.

As previously described with respect to FIG. 3A, the data mapping operation 220 may be configured to detect a number of different categories of sensitive data within unstructured data of the unredacted data 210. In other words, the data mapping operation 220 may be able to detect both that a given element of unredacted data contains sensitive as well as what category of sensitive data it is.

FIG. 4B illustrates an example of an index mapping 240 that may result from the data mapping operation 220. The index mapping 240 of FIG. 4B may refer to a portion of the data from the example of FIG. 4A in terms of data values for the index mapping 240. These data values are merely examples to illustrate the types of characterizations that may be made by the data mapping operation 220.

Referring to FIG. 4B, as a result of data mapping operation 220, the index mapping 240 may include a tuple 430 for each category of sensitive data that is detected. Each tuple 430 may include a category 472, an offset 474, and a length 476. The structure of the tuple 430 illustrated in FIG. 4B is merely an example, and is not intended to limit the embodiments of the present disclosure. In some embodiments, the various tuples 430 may be associated with a particular cell (e.g., a particular row of a particular column).

The offset 474 may indicate a distance (e.g., a number of bytes) into the data where sensitive data was found. For example, sensitive data at the beginning of the cell may have an offset of 0. The length 476 may indicate a length (e.g., a number of bytes) of the sensitive data. The category 472 may indicate a category of sensitive data that was found at the location indicated by the offset 474 and length 476. In the example of FIG. 4B, the index mapping 240 for the example data 440 of FIG. 4A indicates that, among other data, sensitive data having a category 472 of NAME, STREET_ADDRESS, CITY, STATE_OR_TERRITORY, POSTAL_CODE, etc. were detected. As an example, the sensitive data of category "NAME" was located at offset 0 and had a length of 12 ("Robert Smith"). The tuples 430 of the index mapping 240 also indicate the offset 474 and length 476 of each of the detected sensitive data. The sensitive data of category "STREET_ADDRESS" was located at offset 23 and had a length of 12 ("1 Snowflake Way"), and so on.

The tuples 430 of the index mapping 240 may be utilized to identify both the category and location of sensitive data within the unredacted data 210. Though FIGS. 4A and 4B illustrate the use of the index mapping 240 with unstructured data (e.g., example data 440 of FIG. 4A), the embodiments of the present disclosure are not limited to such a configuration. In some embodiments, the index mapping 240 may be utilized with semi-structured data. For example, the offsets 474 and lengths 476 may identify leaf nodes within the semi-structured data in a similar manner as with unstructured data.

The format of the data of the index mapping 240 illustrated in FIG. 4B is merely an example and is not intended to limit the embodiments of the present disclosure. In some embodiments, the index mapping 240 may be provided in different formats and/or with more or fewer data elements. It will be understood that other formats, as well as other output values, are possible without deviating from the scope of the present disclosure. For example, in FIG. 4B, the index mapping 240 is illustrated as a separate index column 460 associated with the data column 420, but this is merely an example. In some embodiments, the index mapping 240 may be provided as part of the data column 420 itself. In some embodiments, the index mapping 240 may be provided as part of a separate table.

Referring back to FIG. 2, the data mapping operation 220 may be performed on the unredacted data 210 to generate the path mapping 230 and/or the index mapping 240 as described herein with respect to FIGS. 3A, 3B, 4A, and 4B. In some embodiments, the data mapping operation 220 may be performed periodically. In some embodiments, the data mapping operation 220 may be performed any time data is modified within the unredacted data 210. For example, if data is inserted and/or modified within the unredacted data 210, the data mapping operation 220 may be performed (e.g., on the modified data). By performing the data mapping operation 220 whenever the unredacted data 210 is modified, the data may be protected more thoroughly, as any sensitive data within the unredacted data 210 may be identified immediately (and subject to redaction operation 270, as will be described further herein).

Once the path mapping 230 and/or the index mapping 240 have been generated, a masking policy 250 may be generated based on the path mapping 230 and/or the index mapping 240. The masking policy 250 may indicate operations that may be taken with respect to the unredacted data 210 in response to an access request (e.g., input query 272). For example, not all sensitive data in the unredacted data 210 may be redacted in response to an access operation. In some embodiments, an administrator may be able to configure which categories of sensitive data (e.g., which categories, such as the categories 372 of the path mapping 230 and/or the categories 472 of the index mapping 240) should be redacted, and the type of redaction operation to be performed.

FIG. 5A is a block diagram illustrating an example of a masking policy 250, in accordance with some embodiments of the present disclosure. A description of elements of FIG. 5A that have been previously described will be omitted for brevity. The masking policy 250 of FIG. 5A is merely an example, and is not intended to limit the embodiments of the present disclosure.

The masking policy 250 may include a plurality of entries 510. Each entry 510 may include a category 520 and an operation 524 that is associated with the category 520 of the entry 510. The category 520 may specify a category of the sensitive data included in the unredacted data 210. For example, the category 520 may be one of the categories 372 of the path mapping 230 and/or the categories 472 of the index mapping 240. For example, the category 520 may refer to one of the categories illustrated in Table 1.

The operation 524 may refer to an operation to be performed on data of the corresponding category 520. In some embodiments, the operation 524 may identify a series of instructions (e.g., computer instructions) that are to be performed on data that is identified as being of the category specified by category 520. In some embodiments, the operation 524 may be a function name. In some embodiments, the operation 524 may be a reference to a default set of instructions that perform a type of redaction of sensitive data. In some embodiments, the operation 524 may be a reference to user-provided instructions and/or algorithms.

Referring to FIG. 5A, an example is shown of an operation 524 of "FullRedactTag." As an example only, an operation such as "FullRedactTag" may perform a full redaction of the sensitive data. As an example, if sensitive data is detected of a particular category (e.g., SSN) having a value of "1234", a full redaction may replace all of the data value with another value, such as "[REDACTED]". This is merely an example of full redaction, but other types of full redaction may be performed without deviating from the embodiments of the present disclosure. For example, the redaction may replace the data value by "****" or other type of masking characters.

Other types of redaction beyond a full redaction may be performed. For example, as illustrated in FIG. 5A, a generalization operation (such as that indicated by "ZipCodeGeneralizationTag" in FIG. 5A) may be performed the provides a partial redaction of the data value. As an example, if sensitive data is detected of a particular category (e.g., POSTAL_CODE) having a value of "98033", it may be generalized to replace the data value as "98000" (e.g., changing just some of the content of the data value). Similar types of partial redaction may be performed for different types of data. For example, for a credit card number (category PAYMENT_CARD), a partial redaction operation may remove all but the last four numbers.

In some embodiments, the operation 524 may be user-created. Thus, a user and/or administrator may compose computer instructions to process a particular type of sensitive data category. Once composed, a reference may be provided to the composed instructions as the operation 524 in the masking policy 250. In this way, a masking policy 250 may be customized to perform specific operations 524 in response to the presence of sensitive data of a particular category 520.

The masking policy 250 may be generated in response to the path mapping 230 and/or the index mapping 240. In some embodiments, the contents of the path mapping 230 and/or the index mapping 240 may be presented to an administrator for use in generating the masking policy 250. FIG. 5B illustrates an example of a user interface 530 for generating a masking policy 250, in accordance with some embodiments of the present disclosure. A description of elements of FIG. 5B that have been previously described will be omitted for brevity. The user interface 530 illustrated in FIG. 5B is merely an example, and it will be understood that other types of user interfaces may be utilized without deviating from the embodiments of the present disclosure.

The user interface 530 may include multiple columns that may be generated from the path mapping 230 and/or the index mapping 240. For example, elements of a first column 532 may indicate a column or sub-column of data (e.g., a column within a table of the unredacted data 210), elements of a second column 534 may indicate a detected category of sensitive data within the unredacted data 210 (such as category 520 described with respect to FIG. 5A), and elements of a third column 536 may indicate an operation (such as operation 524 described with respect to FIG. 5A) to be performed to redact data of the corresponding category.

As previously described, in some embodiments, the unredacted data 210 may include semi-structured and/or unstructured data which may include different types of sensitive data. For example, as illustrated in FIG. 5B, the data mapping operation 220 may determine that multiple types of sensitive data are associated with a particular column (e.g., column "DATA" in FIG. 5B). To indicate that multiple types of sensitive data categories are available for a particular column, a pull-down interface control 538 may be provided within the user interface 530.

In response to the user selecting the pull-down interface control 538, additional rows may be provided to illustrate additional categories of sensitive data within a particular column. FIG. 5C illustrates an example of a user interface 530' for selecting a masking policy 250 for multiple categories of sensitive data within a particular column, in accordance with some embodiments of the present disclosure. A description of elements of FIG. 5C that have been previously described will be omitted for brevity. The user interface 530' illustrated in FIG. 5C is merely an example, and it will be understood that other types of user interfaces may be utilized without deviating from the embodiments of the present disclosure.

The user interface 530' of FIG. 5C illustrates an example in which the pull-down interface control 538 has been selected. The pull-down interface control 538 may expand a particular row to illustrate a plurality of different categories 520 that have been identified for a particular sub-columns (e.g., paths 330 of FIG. 3B) or index location (e.g., tuples 430 of FIG. 4B). In the example of FIG. 5C, it is illustrated that the column DATA has been identified (e.g., by operation of the data mapping operation 220) of containing sensitive data including categories 520 of "NAME", "STREET_ADDRESS", "POSTAL_CODE", "CITY", "STATE_OR_TERRITORY", "AGE", "SSN", and "GENDER".

The categories 520 identified in the user interface 530' may be presented in response to the data mapping operation 220 having detected these categories 520 of sensitive data within the unredacted data 210. In some embodiments, the categories 520 identified in the user interface 530' may be presented based on a probability that a given element of unredacted data 210 is sensitive data or a frequency that the category 520 is present within the column. For example, referring to the path mapping 230 of FIG. 3B, a particular category 520 may be illustrated within the user interface 530' based on a particular priority 370 and/or coverage 374 exceeding a threshold value. This may attempt to restrict the categories 520 within the user interface 530' to those which are present more frequently in the table, or are more likely to be sensitive data.

Referring to FIG. 5B, in some embodiments, the third column 536 may be user-selectable. By clicking (e.g., utilizing a mouse or touch pad) a cell associated with a given category 520 of the second column 534, a user may select a particular operation 524 to be performed associated with a given category 520. Selecting the cell may, for example, present a drop-down list including different types of redaction operations 524. By selecting a particular operation 524, the operation 524 may be associated with the corresponding category 520 within the masking policy 250. In the example of FIG. 5C, the operation 524 associated with "FullRedact- Tag" (e.g., a full redaction operation) has been selected with respect to categories 520 of "SSN" and "STREET_ADDRESS" and the operation 524 associated with "ZipCode-Generalization tag (e.g., a partial redaction operation) has been selected with respect to category 520 of "POSTAL_CODE".

The user interfaces 530, 530' may present a mapping between paths of sensitive data within the unredacted data 210 and categories 520 of the sensitive data. In addition, the user interfaces 530, 530' may provide a way to generating the masking policy 250 to identify redaction operations 524 to be performed on particular categories of sensitive data. For example, in response to the selection of the operation 524 made within the third column 536, the masking policy 250 may be generated that contains the category 520 and operations 524 that are specified within the user interfaces 530, 530'. In some embodiments, the operation 524 may also be specified as "NONE", which may mean that no redaction will be performed with respect to sensitive data of that category 520 detected within the unredacted data 210.

Referring back to FIG. 2, the masking policy 250 may be utilized to perform a redaction operation 270 on the unredacted data 210 (e.g., in response to input query 272). For example, the input query 272 may access the unredacted data 210, which may include sensitive data. A data redaction operation 270 may redact the sensitive data from the unredacted data 210 based on the characteristics of the masking policy 250 to generate redacted data 280 for a query response 274 to the input query 272.

The redaction operation 270 may allow for the sensitive data of the unredacted data 210 to be identified and, in some embodiments, redacted and/or masked without requiring that the sensitive data be exported. Avoiding the data exportation may reduce the need for resources to protect the unredacted data 210 and may make data governance easier. In addition, the use of the redaction operation 270 within the cloud computing service 112 may allow for the redaction operation 270 to be performed utilizing standard database queries that may abstract the complexity of the redaction operation 270 from the client device 101. In addition, the redaction operation 270 may be able to provide its results (e.g., redacted data 280) in a standard format that can be easily accessed, parsed, and incorporated into other database queries.

As discussed herein, in some embodiments, access to the redaction operation 270 may be performed utilizing standard database operations and/or infrastructure. One example of such a database operation is a UDF. A UDF is a programmatically defined object that provides a mechanism for extending the functionality of the database server by adding a function that can be evaluated in standard query language (usually SQL) statements. When referenced (or "called"), a UDF is configured to execute a query that retrieves data from one or more underlying tables, or executes a procedure to generate data. The generated data may be returned from the UDF call and may provide access to the retrieved data in a similar manner as a database table.

Figure 6A:
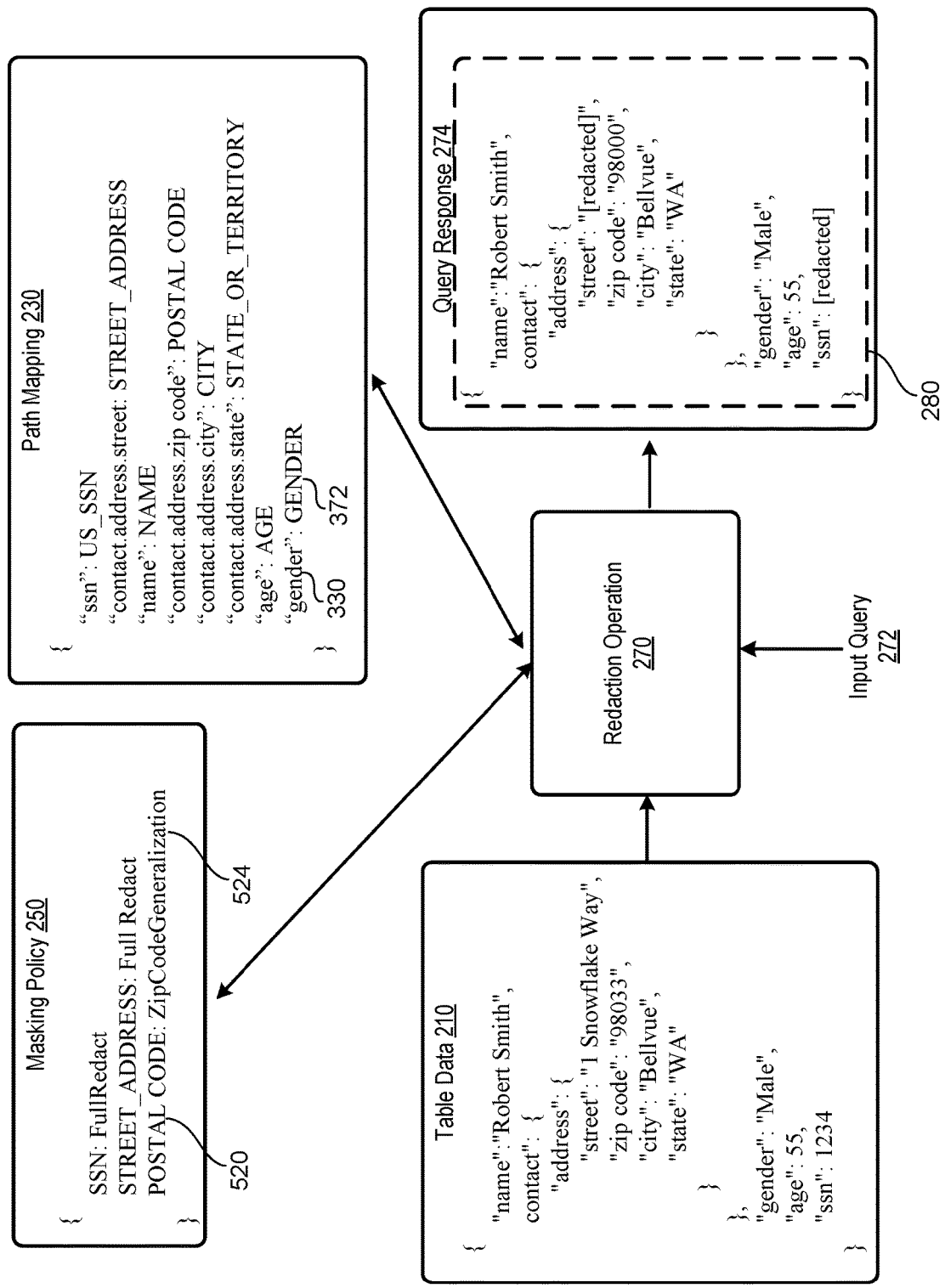
FIG. 6A is a schematic block diagram of an example embodiment of utilizing the masking policy and the path mapping to perform the redaction operation, in accordance with some embodiments of the present disclosure.

FIG. 6A is a schematic block diagram of an example embodiment of utilizing the masking policy 250 and the path mapping 230 to perform the redaction operation 270, in accordance with some embodiments of the present disclosure. As FIG. 6A contains elements that are the same or similar as discussed herein with respect to prior figures, a duplicate description thereof will be omitted for brevity.

Referring to FIG. 1 and FIG. 6A, embodiments of the present disclosure may be implemented as part of a virtual warehouse 131 of the query processing component 130 (see FIG. 1). The query processing 130 for some embodiments of the present disclosure may be implemented in response to the input query 272 (e.g., from client device 101). The input query 272 may be, for example, a SQL query or other SQL construct.

The input query 272 may refer to the unredacted data 210. For example, the input query 272 may perform an operation that would return data, which may otherwise include sensitive data, from the unredacted data 210. The redaction operation 270 may be performed to redact the sensitive data from the unredacted data 210 to generate redacted data 280 in accordance with the masking policy 250. In the example of FIG. 6A, the unredacted data 210 referenced by the input query 272 may include semi-structured data. The format of the semi-structured unredacted data 210 is merely an example, and is not intended to limit the embodiments of the present disclosure.

As part of the redaction operation 270, the path mapping 230 may be referenced. The path mapping 230 may indicate the location of sensitive data within the unredacted data 210. For example, the path mapping 230 may include the location of paths 330 within the semi-structured data of the unredacted data 210 that contain sensitive data, and the categories 372 of the sensitive data.

In response to determining that the unredacted data 210 contains sensitive data, the redaction operation 270 may access the masking policy 250. The masking policy 250 may indicate which categories 520 of the sensitive data are to be redacted, as well as the operations 524 that are to be performed on the sensitive data. If the redaction operation 270 determines that a category of sensitive data that is within the unredacted data 210 that is referenced by the input query 272, the redaction operation may perform the operation 524 indicated by the masking policy 250 upon the path 330 associated with sensitive data to redact the sensitive data and generate the redacted data 280 for the query response 274.

For example, in the example of FIG. 6A, the masking policy 250 indicates that redaction operations 524 are to be performed on sensitive data of categories "SSN", "STREET_ADDRESS", and POSTAL_CODE". Moreover, the redaction operation 270 may determine, by utilizing the path mapping 230, that sensitive data of categories 520 of "SSN", "STREET_ADDRESS", and POSTAL_CODE" are associated with paths (sub-columns) "ssn", "contact.address.street", and "contact.address.zip code" within the semi-structured data of the unredacted data 210.

Using the locations provided by the path mapping 230, the redaction operation 270 may identify the locations of the sensitive data within the unredacted data 210. The redaction operation 270 may then perform the operation 524 indicated by the masking policy 250 for the respective categories 520 of sensitive data. For example, the redaction operation 270 may perform full redaction on the "ssn" and "contact.address.street" paths to generate rows of redacted data 280 of the query response 274. The redaction operation 270 may perform a partial redaction (e.g., utilizing a generalization function) on the "contact.address.zip code" paths to generate rows of redacted data 280 of the query response 274.

The redaction operation 270 may perform the operation 524 indicated by the masking policy on the unredacted data 210 to generate the redacted data 280 of the query response 274, which may be provided, for example, to the client device 101. In some embodiments, the query response 274 may provide the redacted data 280 of the redaction operation 270 to the client device 101 in a standard database format (e.g., as tabular data capable of being accessed and/or manipulated by SQL statements).

In some embodiments, the redaction operation 270 may be configured to adjust the redaction based on the hierarchical nature of the paths of the semi-structured data. For example, a reference (e.g., in input query 272) to "contact.address.zip code" may be redacted based on the masking policy 250 and/or the path mapping 230 to be returned as "98000" (e.g., by partial redaction). The same data may be redacted and returned as part of a reference to "contact", which may return "{"address": {"street": "[redacted]", "zip code": "98000", "city": "Bellvue", "state": "WA"}". Thus, a particular data value at a particular leaf node within the semi-structured data may be redacted regardless of which path in its hierarchy is utilized to access the data.

Figure 6B:
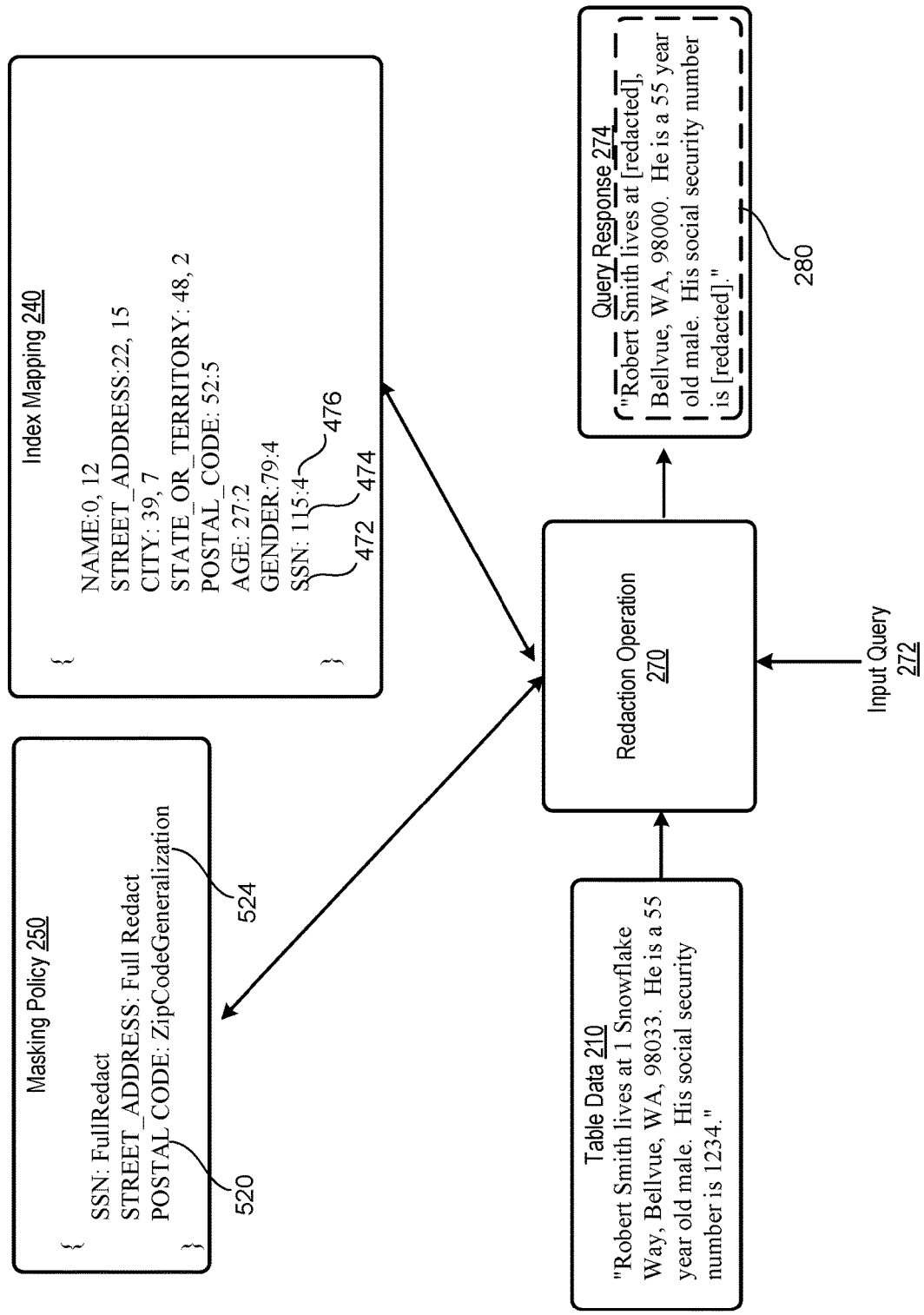
FIG. 6B is a schematic block diagram of an example embodiment of utilizing the masking policy and the index mapping to perform the redaction operation, in accordance with some embodiments of the present disclosure.

FIG. 6B is a schematic block diagram of an example embodiment of utilizing the masking policy 250 and the index mapping 240 to perform the redaction operation 270, in accordance with some embodiments of the present disclosure. As FIG. 6B contains elements that are the same or similar as discussed herein with respect to prior figures, a duplicate description thereof will be omitted for brevity.

Referring to FIG. 6B, the redaction operation 270 utilizing the index mapping 240 may be performed in response to an input query 272, as described herein with respect to FIG. 6A. For example, the input query 272 may refer to the unredacted data 210 including unstructured data. For example, the input query 272 may perform an operation that would return unstructured data, which may otherwise include sensitive data, from the unredacted data 210. The redaction operation 270 may be performed to redact the sensitive data from the unredacted data 210 to generate redacted data 280 in accordance with the masking policy 250. The format of the unstructured unredacted data 210 is merely an example, and is not intended to limit the embodiments of the present disclosure.

As part of the redaction operation 270, the index mapping 240 may be referenced. The index mapping 240 may indicate the location of sensitive data within the unredacted data 210. For example, the index mapping 240 may include offsets 474 and lengths 476 within the unstructured data of the unredacted data 210 that contain sensitive data, and the categories 472 of the sensitive data.

In response to determining that the unredacted data 210 contains sensitive data, the redaction operation 270 may access the masking policy 250. The masking policy 250 may indicate which categories 520 of the sensitive data are to be redacted, as well as the operations 524 that are to be performed on the sensitive data. If the redaction operation 270 determines that a category of sensitive data is within the unredacted data 210 that is referenced by the input query 272, the redaction operation may perform the operation 524 indicated by the masking policy 250 upon the sensitive data.

For example, in the example of FIG. 6B, the masking policy 250 indicates that redaction operations 524 are to be performed on sensitive data of categories "SSN", "STREET_ADDRESS", and POSTAL_CODE". Moreover, the redaction operation 270 may determine, by utilizing the index mapping 240, that sensitive data of categories 472 of "SSN", "STREET_ADDRESS", and POSTAL_CODE" are located within a particular cell of unstructured data of the unredacted data 210 at offset 115, length 4 (SSN), offset 22, length 15 (STREET_ADDRESS), and offset 52, length 5 (POSTAL_CODE). It will be understood that different offsets and/or lengths may be associated with different rows of the unredacted data 210 that are accessed by the input query 272.

Using the offsets 474 and lengths 476 provided by the index mapping 240, the redaction operation 270 may identify the locations of the sensitive data within the unredacted data 210. The redaction operation 270 may then perform the operation 524 indicated by the masking policy 250 for the respective categories 520 of sensitive data. For example, the redaction operation 270 may perform full redaction on the data at an offset of 115 bytes for a length of 4 bytes (SSN) and at an offset of 22 bytes for a length of 15 bytes (STREET_ADDRESS) within the row of the unredacted data 210 referenced by the input query 272 (as indicated by the index mapping 240). The redaction operation 270 may perform a partial redaction (e.g., utilizing a generalization function) at the location that is offset by 52 bytes for a length of 5 bytes (POSTAL_CODE) within the row of the unredacted data 210 referenced by the input query 272 (as indicated by the index mapping 240).

The redaction operation 270 may perform the operation 524 indicated by the masking policy 250 on the unredacted data 210 to generate the redacted data 280 of the query response 274, which may be provided, for example, to the client device 101. In some embodiments, the query response 274 may provide the redacted data 280 of the redaction operation 270 to the client device 101 in a standard database format (e.g., as tabular data capable of being accessed and/or manipulated by SQL statements).

Referring back to FIG. 2, the system 200 may be able to map both locations and categories of sensitive data within unredacted data 210. The system 200 may be configured to recognize sensitive data within hierarchical paths of semi-structured data and/or unstructured data. The mapping of the sensitive data may be utilized by a redaction operation 270, in conjunction with a masking policy 250 in some embodiments, to locate and redact sensitive data in semi-structured and unstructured contexts.

The embodiments of the present disclosure may provide a technological improvement in the field of computer operations and database processing. The embodiments of the present disclosure may increase a security of database operations by allowing for the selective redaction of sensitive data within hierarchical semi-structured data as well as in unstructured data. By allowing for the categorization and redaction of the sensitive data to be performed in situ, embodiments of the present disclosure may reduce opportunities for sensitive data to be exposed outside of the database and may allow for customized redaction of the sensitive data, even in unstructured or semi-structured environments.

Figure 7:
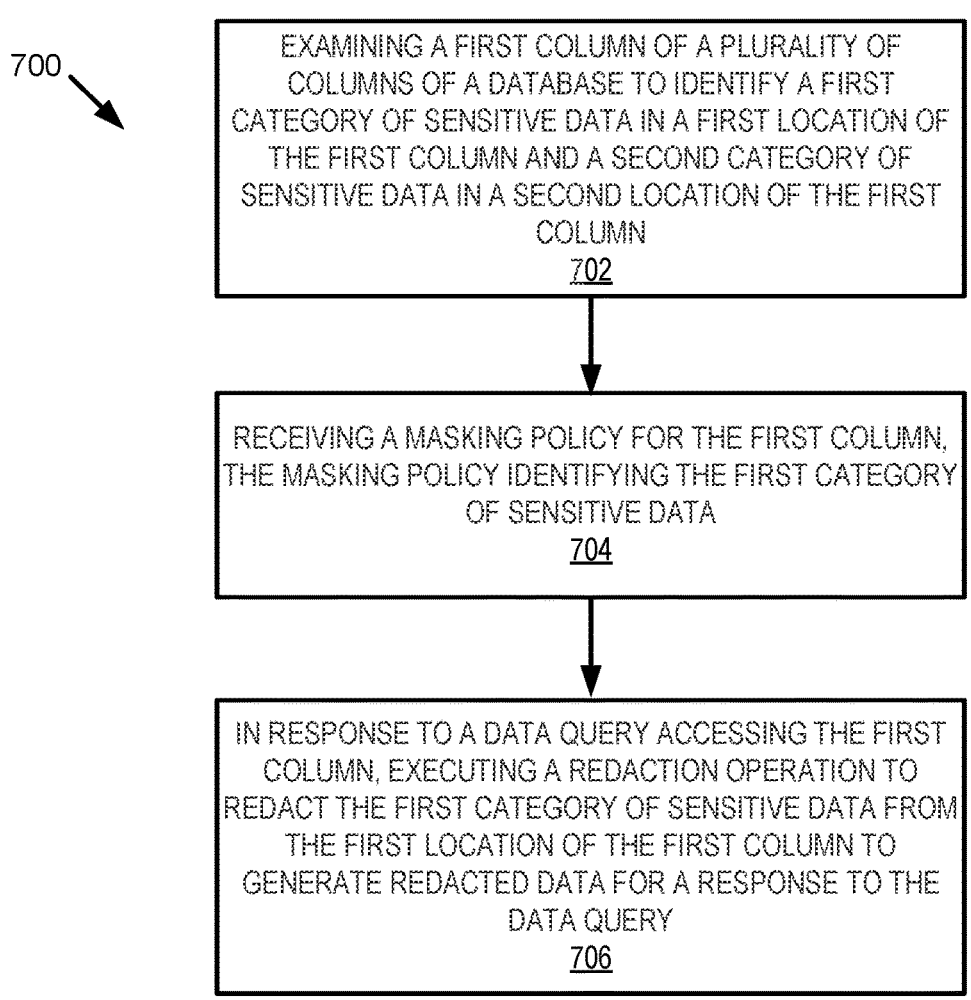
FIG. 7 is a flow diagram of one embodiment of a method to perform a data mapping operation and/or a redaction operation on a data set, in accordance with some embodiments of the present disclosure.

FIG. 7 is a flow diagram of one embodiment of a method 700 to perform a data mapping operation 220 and/or a redaction operation 270 on a data set, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by a computing device (e.g., cloud computing platform 110).

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Referring simultaneously to FIGS. 1 to 6B as well, the method 700 begins at block 702, where the processing logic may perform operations including examining a first column of a plurality of columns of a database to identify a first category of sensitive data in a first location of the first column and a second category of sensitive data in a second location of the first column. In some embodiments, the first category and second category of sensitive data may be similar to categories 372, 472 described herein (e.g., with respect to FIGS. 3B and 4B). In some embodiments, the first and second locations may be similar to the paths 330 and the offsets 474 described herein (e.g., with respect to FIGS. 3B and 4B). In some embodiments, the first column may include semi-structured and/or unstructured database data.

At block 704, the processing logic may perform operations including receiving a masking policy for the first column, the masking policy identifying the first category of sensitive data. In some embodiments, the masking policy may be similar to masking policy 250 described herein with respect to FIGS. 2 to 6B. In some embodiments, the first category may be identified within the masking policy similarly to the category 520 described herein with respect to FIGS. 5A to 5C.

At block 706, the processing logic may perform operations including, in response to a data query accessing the first column, executing a redaction operation to redact the first category of sensitive data from the first location of the first column to generate redacted data for a response to the data query. In some embodiments, the redaction operation may be similar to redaction operation 270 described herein with respect to FIGS. 2 to 6B. In some embodiments, the data query and the redacted data may be similar input query 272 and the redacted data 280 described herein with respect to FIGS. 2 to 6B.

In some embodiments, the redaction operation is a first redaction operation, the first location and the second location are within a same row of the first column, and the masking policy for the first column further identifies the second category of sensitive data. The method 700 may further include, in response to the data query accessing the first column, executing, by the processing device, a second redaction operation to redact the second category of sensitive data from the second location of the first column to generate the redacted data for the response to the data query.

In some embodiments, database data associated with the first location comprises a plurality of hierarchical sub-columns, and the method 700 may further include generating a path mapping that associates a first sub-column of the plurality of hierarchical sub-columns with the first category of sensitive data. In some embodiments, the plurality of hierarchical sub-columns may be similar to the paths 330 described herein with respect to FIGS. 2 to 6B. In some embodiments, the generation of the path mapping may be similar to the data mapping operation 220 to generate the path mapping 230, as described herein with respect to FIGS. 2 to 6B. In some embodiments, the redaction operation is to redact the first category of sensitive data located at the first sub-column of the plurality of hierarchical sub-columns based on the path mapping.

In some embodiments, examining the first column of the plurality of columns of the database to identify the first category of sensitive data in the first location of the first column and the second category of sensitive data in the second location of the first column may include identifying a first offset indicating the first location of the first category of sensitive data within the first column and a second offset indicating the second location of the second category of sensitive data within the first column. In some embodiments, the first offset and the second offset may be similar to the offsets 474 described herein (e.g., with respect to FIG. 4B). In some embodiments, the redaction operation is to redact the first category of sensitive data located at the first location indicated by the first offset. In some embodiments, the first offset and/or the second offset may be indicated by an index mapping, such as the index mapping 240 described herein (e.g., with respect to FIG. 4B).

As described herein, a cloud services platform can provide access to a redaction capability for sensitive data that is stored in a semi-structured and/or unstructured format. The redaction capability may allow for the identification of sensitive data to be performed in situ within the database without requiring a data export and through standard database mechanisms. The redaction capability may allow for selective redaction of multiple categories of sensitive data within a same column of data.

Figure 8:
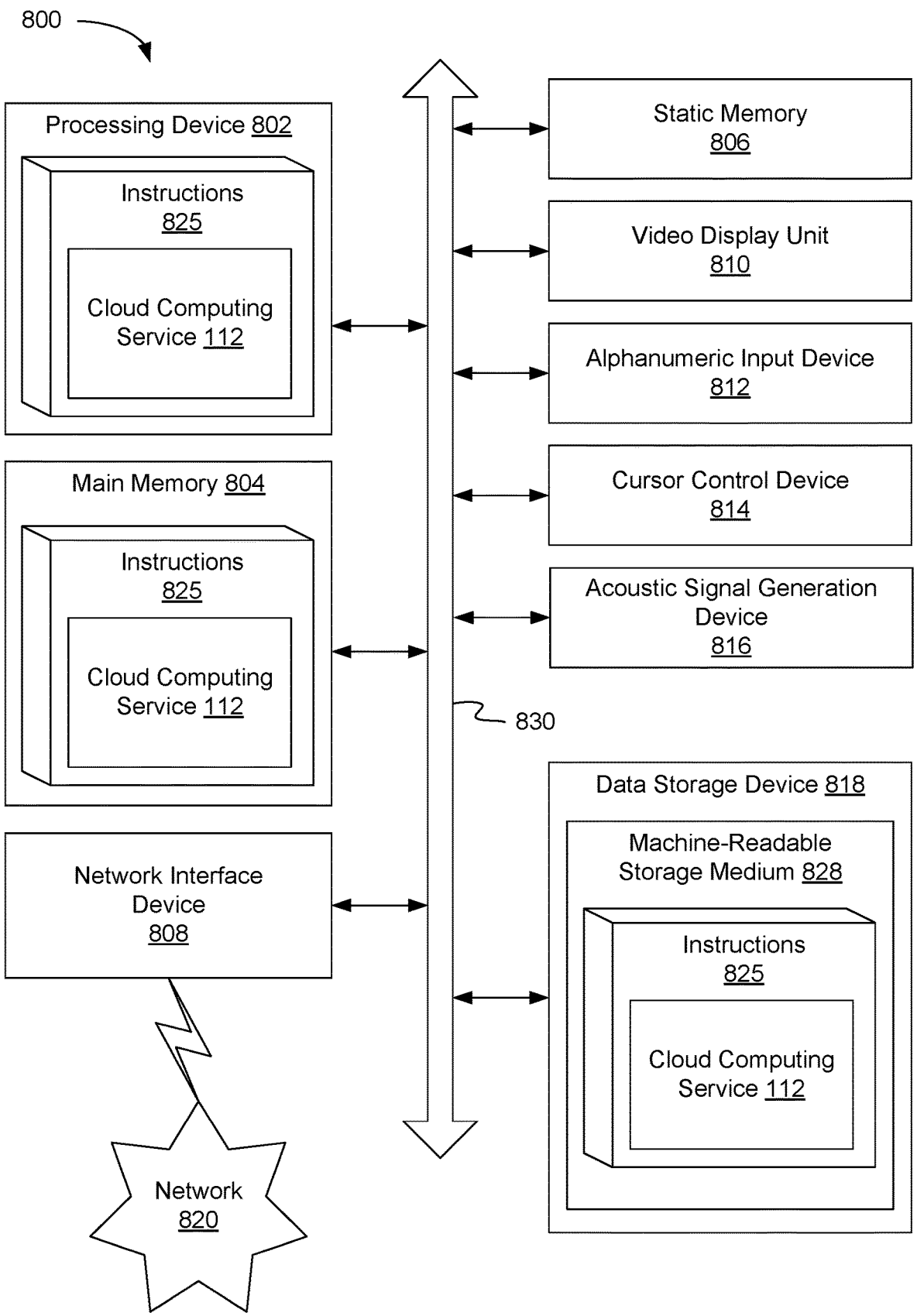
FIG. 8 is a block diagram of an example computing device that may perform one or more of the operations described herein, in accordance with some embodiments of the present disclosure.

FIG. 8 is a block diagram of an example computing device 800 that may perform one or more of the operations described herein, in accordance with some embodiments. Computing device 800 may be connected to other computing devices in a LAN, an intranet, an extranet, and/or the internet. The computing device may operate in the capacity of a server machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 1406 (e.g., flash memory) and a data storage device 818, which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein. In one embodiment, processing device 802 represents a processing device of cloud computing platform 110 of FIG. 1.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825, such as instructions for executing the cloud computing service 112, e.g., instructions for carrying out the operations described herein, in accordance with one or more aspects of the present disclosure. The instructions 825 may also reside, completely or at least partially, within main memory 804 and/or within processing device 802 during execution thereof by computing device 800, the main memory 804 and processing device 802 also constituting computer-readable media. The instructions 825 may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "examining," "receiving," "executing," "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   examining a first column of a plurality of columns of a database to identify a first category of sensitive data in a first location of the first column and a second category of sensitive data in a second location of the first column, wherein the first location and the second location are within a same row of the first column;
   receiving a masking policy for the first column, the masking policy identifying the first category of sensitive data, wherein the masking policy for the first column further identifies the second category of sensitive data; and
   in response to a data query accessing the first column, executing, by a processing device:
      a first redaction operation to redact the first category of sensitive data from the first location of the first column to generate redacted data for a response to the data query; and
      a second redaction operation to redact the second category of sensitive data from the second location of the first column to generate the redacted data for the response to the data query.

2. The method of claim 1, wherein database data associated with the first location comprises a plurality of hierarchical sub-columns, and
   wherein the method further comprises:
      generating a path mapping that associates a first sub-column of the plurality of hierarchical sub-columns with the first category of sensitive data.

3. The method of claim 2, wherein the fir redaction operation is to redact the first category of sensitive data located at the first sub-column of the plurality of hierarchical sub-columns based on the path mapping.

4. The method of claim 1, wherein examining the first column of the plurality of columns of the database to identify the first category of sensitive data in the first location of the first column and the second category of sensitive data in the second location of the first column comprises identifying a first offset indicating the first location of the first category of sensitive data within the first column and a second offset indicating the second location of the second category of sensitive data within the first column.

5. The method of claim 4, wherein the fir redaction operation is to redact the first category of sensitive data located at the first location indicated by the first offset.

6. The method of claim 1, wherein the first redaction operation is a full redaction of the first category of sensitive data from the first location of the first column and the second redaction operation is a partial redaction of the second category of sensitive data from the second location of the first column.

7. The method of claim 1, wherein the first location and the second location are within different rows of the first column.

8. A system comprising:
   a memory; and
   a processing device operatively coupled to the memory, the processing device to:
      examine a first column of a plurality of columns of a database to identify a first category of sensitive data in a first location of the first column and a second category of sensitive data in a second location of the first column, wherein the first location and the second location are within a same row of the first column;
      receive a masking policy for the first column, the masking policy identifying the first category of sensitive data, wherein the masking policy for the first column further identifies the second category of sensitive data; and in response to a data query accessing the first column:
    execute a first redaction operation to redact the first category of sensitive data from the first location of the first column to generate redacted data for a response to the data query; and
    execute a second redaction operation to redact the second category of sensitive data from the second location of the first column to generate the redacted data for the response to the data query.

9. The system of claim 8, wherein database data associated with the first location comprises a plurality of hierarchical sub-columns, and
    wherein the processing device is further to:
        generate a path mapping that associates a first sub-column of the plurality of hierarchical sub-columns with the first category of sensitive data.

10. The system of claim 9, wherein the first redaction operation is to redact the first category of sensitive data located at the first sub-column of the plurality of hierarchical sub-columns based on the path mapping.

11. The system of claim 8, wherein, to examine the first column of the plurality of columns of the database to identify the first category of sensitive data in the first location of the first column and the second category of sensitive data in the second location of the first column, the processing device is to identify a first offset indicating the first location of the first category of sensitive data within the first column and a second offset indicating the second location of the second category of sensitive data within the first column.

12. The system of claim 11, wherein the first redaction operation is to redact the first category of sensitive data located at the first location indicated by the first offset.

13. The system of claim 8, wherein the first redaction operation is a full redaction of the first category of sensitive data from the first location of the first column and the second redaction operation is a partial redaction of the second category of sensitive data from the second location of the first column.

14. The system of claim 8, wherein the first location and the second location are within different rows of the first column.

15. A non-transitory computer-readable storage medium including instructions that, when executed by a processing device, cause the processing device to:
    examine a first column of a plurality of columns of a database to identify a first category of sensitive data in a first location of the first column and a second category of sensitive data in a second location of the first column, wherein the first location and the second location are within a same row of the first column;
    receive a masking policy for the first column, the masking policy identifying the first category of sensitive data, wherein the masking policy for the first column further identifies the second category of sensitive data; and
    in response to a data query accessing the first column, execute, by the processing device;
        a first redaction operation to redact the first category of sensitive data from the first location of the first column to generate redacted data for a response to the data query; and
        a second redaction operation to redact the second category of sensitive data from the second location of the first column to generate the redacted data for the response to the data query.

16. The non-transitory computer-readable storage medium of claim 15, wherein database data associated with the first location comprises a plurality of hierarchical sub-columns, and
    wherein the processing device is further to:
        generate a path mapping that associates a first sub-column of the plurality of hierarchical sub-columns with the first category of sensitive data.

17. The non-transitory computer-readable storage medium of claim 16, wherein the first redaction operation is to redact the first category of sensitive data located at the first sub-column of the plurality of hierarchical sub-columns based on the path mapping.

18. The non-transitory computer-readable storage medium of claim 15, wherein, to examine the first column of the plurality of columns of the database to identify the first category of sensitive data in the first location of the first column and the second category of sensitive data in the second location of the first column, the processing device is to identify a first offset indicating the first location of the first category of sensitive data within the first column and a second offset indicating the second location of the second category of sensitive data within the first column.

19. The non-transitory computer-readable storage medium of claim 18, wherein the first redaction operation is to redact the first category of sensitive data located at the first location indicated by the first offset.

20. The non-transitory computer-readable storage medium of claim 15, wherein the first redaction operation is a full redaction of the first category of sensitive data from the first location of the first column and the second redaction operation is a partial redaction of the second category of sensitive data from the second location of the first column.

21. The non-transitory computer-readable storage medium of claim 15, wherein the first location and the second location are within different rows of the first column.

* * * * *